United States Patent [19]

Aoyama et al.

[11] Patent Number: 4,597,818
[45] Date of Patent: Jul. 1, 1986

[54] METHOD FOR PRODUCING LAMINATED SHEETS OR FILMS

[75] Inventors: Takeo Aoyama; Syoji Magara; Shigeki Yokoyama, all of Yokohama; Tadashi Kamei, Yokosuka; Mikio Uehara, Tokyo, all of Japan

[73] Assignee: Nippon Petrochemicals Company, Limited, Tokyo, Japan

[21] Appl. No.: 694,205

[22] Filed: Jan. 24, 1985

[30] Foreign Application Priority Data

Jan. 25, 1984 [JP] Japan .................. 59-11393

[51] Int. Cl.⁴ ........................................... B65C 9/25
[52] U.S. Cl. .......................... 156/308.2; 156/324; 156/334; 156/555; 428/517; 428/523; 526/352
[58] Field of Search ............ 156/555, 324, 334, 283, 156/308.2, 309.6, 323, 272.2, 272.6; 428/516, 517, 521, 523; 526/352

[56] References Cited

U.S. PATENT DOCUMENTS 3,767,511 10/1973 Slade .......................... 156/555 X Primary Examiner—David Simmons
Attorney, Agent, or Firm—Scully, Scott, Murphy & Presser

[57] ABSTRACT

A novel method for producing laminated sheets or films consisting of a substrate layer or layers and a layer or layers of ultra-high molecular weight polyethylene. The method is characterized by the steps of: superposing at least one layer of ultra-high molecular weight polyethylene in powder or preformed sheet form and at least one layer of a substrate of another material upon one face of a tensioned endless belt travelling around a set of rolls, with an adhesive interposed between said layers if necessary; pressing or squeezing said ultra-high molecular weight polyethylene layer between said substrate layer and said endless belt, or between said substrate layers, against one or more heating rolls under the tension of said endless belt; heating at least said ultra-high molecular weight polyethylene layer to a temperature above its melting point; and thereby uniting said superposed ultra-high molecular weight polyethylene and substrate layers into a laminated sheet or film.

6 Claims, 3 Drawing Figures

METHOD FOR PRODUCING LAMINATED SHEETS OR FILMS

BACKGROUND OF THE INVENTION (1) Field of the Invention

This invention relates to a method for continuously producing laminated sheets or films from a substrate sheet material and ultra-high molecular weight polyethylene (hereinafter sometimes simply referred to as "UHMWPE").

More particularly, the invention relates to a method for continuously producing laminated sheets or films from ultra-high molecular weight polyethylene which has a high melt viscosity and can be processed difficultly, and a substrate sheet material such as other various kinds of thermoplastic resins, rubbers, metals and cloths.

(2) Description of the Prior Art

Ultra-high molecular weight polyethylene has excellent impact strength and abrasion resistance. However, the consumption of this resin is very small because its processing is difficult.

Articles, sheets, and plates of ultra-high molecular weight polyethylene are formed by, for example, sintering, ram extrusion using a plunger pump, forging, and compression molding. However, it is very difficult to produce thin sheets or films (hereinafter referred to simply as "sheets") of less than 1 mm in thickness from ultra-high molecular weight polyethylene. According to the present industrial practice, thin sheets of this kind are produced by applying a secondary working such as skiving to a cylinder obtained by one of the above-mentioned methods. Therefore, with this method, the processing cost is high and continuous production of thin sheets on a large scale is quite difficult.

The difficulty in processing ultra-high molecular weight polyethylene arises from the fact that it has quite a high melt viscosity and has no good melt flow properties, and therefore, the conventionally employed tubular film method and T-die method in which the pressure drop is large, are not suitable.

Meanwhile, as a hitherto well known method for forming sheets, there is a calendering method. Because sheets of accurate and uniform thickness can be produced at a high rate, polyvinyl chloride sheets and rubber sheets are produced by this method. In the case of polyolefin resins, their melt strengths are low and their melt viscosities are largely dependent on temperature, so that the optimum range of their forming temperatures is narrow, which makes the forming operation difficult. Accordingly, this method is seldom employed for polyolefin resins.

Furthermore, as described above, the ultra-high molecular weight polyethylene is not only difficultly processable but also not susceptible to adhesives because it has no functional group. Accordingly, the preparation of laminated sheets with other substrate materials is considered to be very difficult.

As the methods for laminating the ultra-high molecular weight polyethylene with various substrate materials, there are proposed some methods in Japanese Laid-Open Patent Publication Nos. 57-207669, 58-20273, and 58-155918. However, it is difficult to produce continuously laminated sheets of uniform quality by any of the above methods.

BRIEF SUMMARY OF THE INVENTION

In view of the above-described state of the prior art, the inventors of the present application have carried out extensive studies in order to solve these problems, and as a result, the present invention has been accomplished.

It is, therefore, the primary object of the present invention to eliminate the above-described problems in the conventional art by proposing a novel method for producing laminated sheets using a difficultly-processable resin such as ultra-high molecular weight polyethylene.

Another object of the present invention is to provide a method for producing laminated sheets having excellent mechanical properties.

A further object of the present invention is to provide a method for producing laminated sheets which can be put into practice easily by using relatively simple apparatus.

That is, in a method for producing laminated sheets consisting of a substrate layer and a layer of ultra-high molecular weight polyethylene, the method of the present invention is characterized by the steps of: superposing at least one layer of ultra-high molecular weight polyethylene in powder or preformed sheet form and at least one layer of a substrate of another material upon one face of a tensioned endless belt travelling around a set of rolls, with an adhesive interposed between said layers if necessary; pressing or squeezing said ultra-high molecular weight polyethylene layer between said substrate layer and said endless belt, or between said substrate layers, against one or more heating rolls under the tension of said endless belt; heating at least said ultra-high molecular weight polyethylene layer to a temperature above its melting point; and thereby uniting said superposed ultra-high molecular weight polyethylene and substrate layers into a laminated sheet or film.

BRIEF DESCRIPTION OF THE DRAWINGS

These and other objects and features of the invention will become more apparent from the following description and embodiments taken in connection with the accompanying drawings, in which.

DETAILED DESCRIPTION OF THE INVENTION

Figure 1:
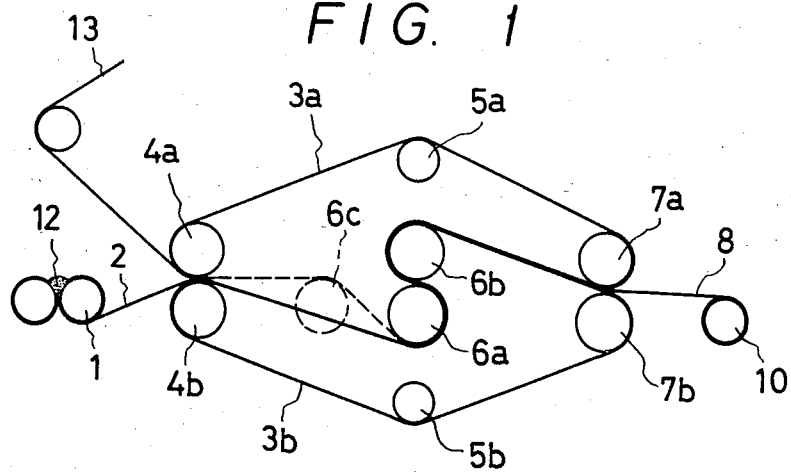
FIG. 1 is a schematic illustration in vertical cross-section of an embodiment of an apparatus used for carrying out the method of the present invention wherein the apparatus is provided with two (or three) heating rolls.

The method of the present invention will now be described in more detail.

The substrate materials used in the method of the present invention are sheets or powders of synthetic resins such as thermoplastic resins and thermosetting resins; rubbers; metallic materials such as metal foils, metal plates and wire nets; and cloths and papers.

The thermoplastic resins that are used as the substrates are exemplified by polyolefin resins including homopolymers such as low, medium or high density polyethylene, polypropylene, polybutene-1 and poly-4-methylpentene-1; copolymers of one of α-olefins such as ethylene or propylene as major components with other polar or nonpolar monomers, e.g., copolymers of ethylene or propylene with other α-olefins, ethylene-vinyl acetate copolymer or its saponification product, and copolymers of ethylene with unsaturated carboxylic acids or their derivatives; polystyrene resin; polyacrylic resin; polyvinyl chloride resin; polyvinylidene chloride resin; polyamide resins such as Nylon-6 (trademark of E.I. du Pont), Nylon-6,6, Nylon-11, Nylon-12 and aromatic polyamide; polycarbonate resin; cellulosic resin; polyester resins such as polyethylene terephthalate and polybutylene terephthalate; fluorocarbon resin such as polytetrafluoroethylene; polyimide resin; polyamide imide resin; polyether-ether ketone resin; polyether sulfone resin; polysulfone resin; polyphenylene oxide resin; polyphenylene sulfide resin; and polyacetal resin.

The thermosetting resins that are used as the substrates are exemplified by epoxy resin, phenol resin, urethane resin, urea resin, and melamine-unsaturated polyester resin.

The rubbers as the substrates are exemplified by synthetic rubbers such as polybutadiene, polyisoprene, neoprene rubber, ethylene-propylene copolymer, ethylene-propylene-diene copolymer, styrene-butadiene copolymer, styrene-acrylonitrile copolymer, styrene-acrylonitrile-butadiene copolymer, butyl rubber, polyurethane rubber, chlorosulfonated polyethylene, chlorinated polyethylene, fluororubber, and Thiokol (trademark of Thiokol Chemical Corp.); and natural rubber.

The metals as the substrates are exemplified by metal foils, metal sheets, wire nets, and punched plates of metals such as iron, aluminum, copper, zinc, brass, and nickel.

The cloths as the substrates are exemplified by woven or non-woven fabrics and nets of fibrous materials such as tape yarns or monofilaments of the foregoing thermoplastic resins; thinly and finely divided or fibrillated polymeric film; woven fabrics of synthetic resin fibers such as polyvinyl alcohol fibers and polyethylene terephthalate fibers, and natural fibers such as cotton, silk and linen; and woven fabrics, mats and felts of inorganic fibers of glass fibers, carbon fibers and metal fibers.

The papers as the substrates are not limited to any particular kinds, but are exemplified by packaging papers such as kraft paper and machine glazed paper; thin paper such as glassine paper; boards and other machine-made paper; Japanese paper such as sliding door paper (shoji paper); and synthetic papers such as styrene paper and polyvinyl alcohol paper.

Furthermore, it is to be noted that the foregoing thermoplastic resin sheets containing fillers can also be used in the method of the present invention.

The above fillers are exemplified by calcium carbonate, magnesium carbonate, calcium sulfate, calcium sulfite, calcium silicate, clay, diatomaceous earth, talc, alumina, siliceous sand, glass powder, iron oxide, metal powders, antimony trioxide, graphite, silicon carbide, silicon nitride, silica, boron nitride, aluminum nitride, wood flour, carbon black, mica, glass flake, sericite, pyrophyllite, aluminum flake, graphite, Shirasu balloons (made in Japan), metal balloons, glass balloons, pumice powder, glass fiber, carbon fiber, graphite fiber, whisker, metal fiber, asbestos, and organic fibers.

The compounding ratio of the above exemplified fillers varies according to the purposes and uses of the laminated sheets; however, the amount is preferably in the range of 5 to 1000 parts by weight of a filler to 100 parts by weight of a thermoplastic resin. Incidentally, the foamed materials and cross-linked substances of the foregoing thermoplastic resins can also be employed in the method of the invention.

The ultra-high molecular weight polyethylene referred to in the present invention means the polyethylene resins having a very high molecular weight as represented by an intrinsic viscosity of 8 or higher in a decalin solution at 135° C.

In the method of the present invention, a powder or a porous sheet of ultra-high molecular weight polyethylene and the substrate are laminated by being pressed or squeezed together in the space between tensioned endless belts travelling around a set of rolls, with the help of an adhesive if necessary. In this operation, at least one face of the superposed layers must be pressed by one of the endless belts. The endless belts are moved in contact with the surfaces of a plurality of heating rolls maintained at a predetermined temperature, thereby heating and laminating the ultra-high molecular weight polyethylene and the substrate into a unitary body. Furthermore, if necessary, cooling rolls are provided after the heating rolls to cool the laminate as a product.

The temperature of the heating rolls must be above the melting point, but below the thermal decomposition point, of the ultra-high molecular weight polyethylene in the case that a material other than thermoplastic resins is used as the substrate. This temperature is generally in the range from 10° C. to 300° C. above the melting point of ultra-high molecular weight polyethylene.

In the case that the substrate is a thermoplastic resin with a melting point far different from that of ultra-high molecular weight polyethylene, the lamination may be carried out by maintaining the heating rolls in contact with the substrate at a temperature different from that of the heating rolls in contact with the ultra-high molecular weight polyethylene. Thus the whole of the materials being joined is not exposed to an excessively high temperature, but their interface is maintained at a desired temperature to perform the lamination under desirable conditions.

That is, one of the characteristic features of the present invention is that a tensioned endless belt is pressed against at least one surface of the superposed materials being united, and the endless belt is moved along and pressed against the surfaces of the heating rolls, thereby laminating the substrate and the ultra-high molecular weight polyethylene into a sheet.

When the endless belt is pressed on only one side of the superposed materials, it is necessary to use a substrate material such as a metal sheet, metal foil, paper, cloth, polyimide resin film or polyethyleneterephthalate film which is neither melted by the heating nor become sticky to the surfaces of the heating rolls. When a pair of endless belts are used, it is possible to apply tension to only one belt; however, the tension is preferably applied to both the belts to press together the superposed layers, bringing the belts into surface-to-surface contact with the heating rolls.

This procedure is quite effective in the formation of laminated sheets having a layer of ultra-high molecular weight polyethylene, which could not easily be made thin through the conventional forming methods.

For example, if ultra-high molecular weight polyethylene in powder or preformed sheet form is introduced between a pair of steel belts travelling in one plane which are pinched together from both sides between a pair of heating rolls, a number of transversal cracks are liable to occur in the sheet and no satisfactory sheet can be obtained, because the melt flowability of the ultra-high molecular weight polyethylene is not good. However, according to the method of the present invention, because the belts are brought into surface-to-surface contact with the heating rolls by moving along the belts around the surfaces of the heating rolls and tension is applied to the pair of belts to give them a pressing force. When a substrate and ultra-high molecular weight polyethylene are put together between the belts and joined by melting, the ultra-high molecular weight polyethylene is formed into a sheet of uniform quality with no transversal cracks in it and is well laminated with the substrate. It is thus possible to produce continuously a tough and wear-resistant laminated sheet.

Furthermore, it is possible to form laminated sheets without using any adhesive in the above step; however, preferably an adhesive should be used, or when it is not used, the substrate and/or ultra-high molecular weight polyethylene may be subjected to surface treatment such as flame treatment, corona discharge treatment or plasma treatment.

The kinds of adhesives are not limited. For example, an adhesive can be properly selected from common adhesives of epoxy, polyurethane, modified acrylate, and cyanoacrylate types; anaerobic adhesives; hot-melt type adhesives; emulsion type adhesives; adhesives of urea resin, melamine, phenol, and rubber types; copolymers of ethylene with unsaturated carboxylic acids such as acrylic acid, methacrylic acid, maleic acid, and maleic anhydride, or their derivatives; ionomers; modified polyolefins with the above unsaturated carboxylic acids grafted.

The physical properties of the sheets obtained by the method of the invention largely depend upon the tension of the endless belts, that is, the pressure applied to the resin held between the pair of endless belts, the travelling speed of the belts, the contact time between the belt and heating roll surfaces, and the surface temperatures of the heating rolls. These conditions can be properly selected in accordance with the kinds of ultra-high molecular weight polyethylene and substrate material used.

Especially, the tension of the belts and the contact time between the belts and heating rolls are closely related to each other. When the tension of the belts is low, a long contact time is necessary, while if the belts are stretched under a high tension, a short contact time is sufficient to produce desirable tough sheets without air bubbles contained.

The tension of the belts must be chosen according to the kind of substrate and other forming conditions employed. The tension is generally 3 kg/cm or higher, and preferably higher than 10 kg/cm as determined by a strain gauge. If the tension of the belts is lower than 3 kg/cm, the rate of sheet formation becomes very low and delamination is liable to occur. While the higher belt tension is the better because the rate of formation can be made higher and a tough sheet can be obtained, when the tension of the belts is too high, the belts can break or their life becomes shorter. Accordingly the maximum tension of the belts must be properly determined in accordance with the strength of the belts, the forming conditions, the kind of substrate material, and other factors.

The endless belts used in the method of the present invention are preferably made of a metal such as stainless steel. However, belts made of other metals, or those which are coated with fluorocarbon resin or silicone resin may also be employed.

In the method of the present invention, the ultra-high molecular weight polyethylene is fed in the form of a sheet or powder. For example, when the material is fed in the form of powder, it is put on a lower belt and then leveled by a doctor knife or the like. The powder is then passed into the space between the lower belt and the upper belt and, while carrying the powder between the belts, the belts are passed along a group of heating rolls. When it is fed in the form of a sheet, a preformed sheet prepared on calender rolls from ultra-high molecular weight polyethylene powder is used. The use of the preformed sheet is preferable because it will help to produce a sheet of uniform thickness through uniform and stable feeding.

Furthermore, if a preformed porous sheet (e.g.: Japanese Laid-Open Patent Publication No. 58-154523, invented by the inventors of this application) is used, tougher laminated sheets can be produced by impregnating the preformed sheet with a thermosetting resin or an adhesive such as the above-mentioned epoxy, unsaturated polyester, polyimide, urethane, acrylate, and isocyanate types; rubber latex; and liquid rubber; owing to their anchor effect.

The apparatus for performing the method of the present invention is provided with a plurality of and preferably two to five heating rolls. Where the melting points or softening points of the substrate material and the ultra-high molecular weight polyethylene are different to a large extent, the temperatures of the heating rolls must be made different alternately to avoid excessive heating of the resin of lower melting point or lower softening point so as to prevent it from undesirable deterioration and deformation (excessive reduction of thickness).

Furthermore, even when a metal or paper is used as a substrate, it is not always necessary that all the heating rolls are of the same temperature. When a pair of endless belts are employed, it is preferable that the temperatures of the rolls in the initial and final stages be set lower in order to facilitate the removing of air from among the particles of the thermoplastic resin in the initial stage and the release of the laminated sheet from the belts in the final stage.

Within the scope of the present invention, common plastic and rubber additives such as plasticizers, stabilizers, lubricants, vulcanizing agents, coloring agents, antistatic agents, coupling agents, and flame retardants can be added to resin materials.

With reference to the accompanying drawings, the method of the present invention will be described in more detail.

Figure 2:
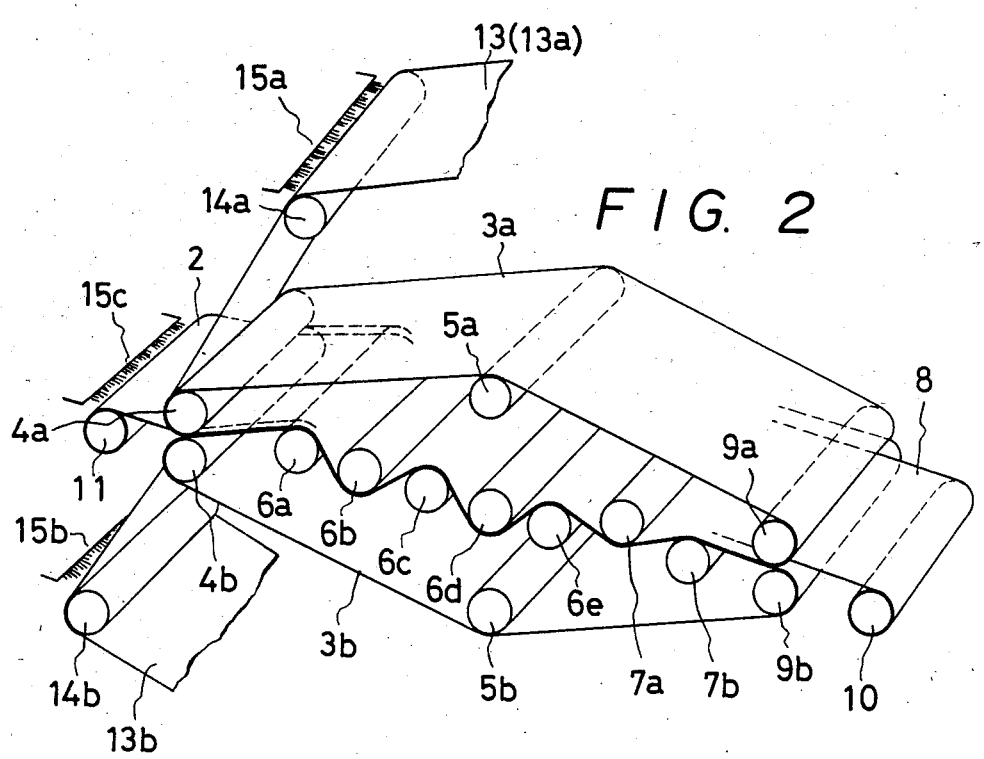
FIG. 2 is a schematic perspective view of another embodiment of the apparatus in which five heating rolls are provided.
Figure 3:
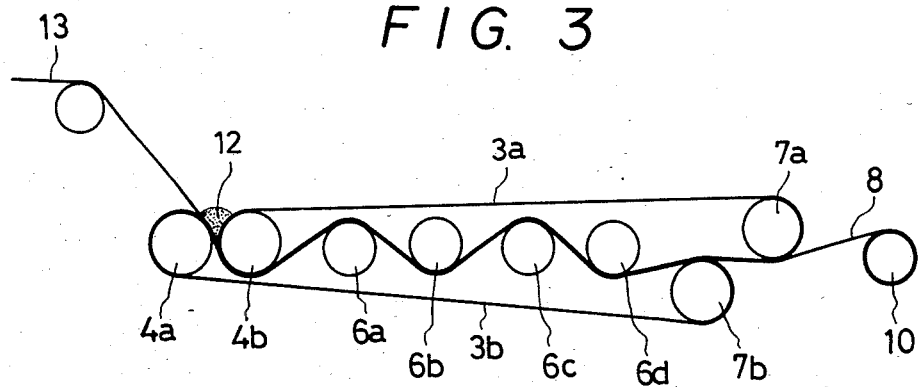
FIG. 3 is a schematic illustration in vertical cross-section of another embodiment of the apparatus wherein a powder of ultra-high molecular weight polyethylene is converted into sheet and simultaneously united with a substrate into a laminate.

Schematically shown in FIGS. 1 to 3 are embodiments of the apparatus for carrying out the method of the present invention. FIG. 1 shows a vertical cross-section of an apparatus which is provided with two or three heating rolls.

A sheet 2 is made by feeding a powder 12 of ultra-high molecular weight polyethylene to a set of calender rolls 1. This preformed sheet 2 and a substrate 13 are introduced together into the space between a pair of endless steel belts 3a and 3b. The endless steel belts 3a and 3b are subjected to tension by being stretched in opposite directions between feed rolls 4a and 4b and cooling rolls 7a and 7b. The endless steel belts 3a and 3b are moved along a passage having at least one bend formed by a group of heating rolls 6a and 6b (if the heating rolls are three, also with a roll 6c shown by broken lines) and around cooling rolls 7a and 7b. The belts 3a and 3b travel round the set of rolls and, being pressed against the heating rolls 6a, 6b (and 6c) under tension, come into tight surface-to-surface contact with them to form a laminated sheet 8, which sheet is then wound up on a wind-up roll 10.

The arrangement of the above-described heating rolls 6a, 6b and 6c is not restricted to that shown in FIG. 1. However, the heating rolls must be so arranged that they come into surface-to-surface contact with the pair of endless steel belts and the rolls press the belts effectively.

Furthermore as described in the foregoing paragraph, the method of this invention can also be carried out by using only one endless belt in the case that the substrate is made of metal sheet, metal foil, cloth, polyimide resin, polytetrafluoroethylene or the like that does not become soft or sticky when it is heated by the heating rolls.

More particularly, in such a case, the endless steel belt 3a and the guide roll 5a in FIG. 1 can be omitted. That is, a sheet 2 is likewise made by feeding the powder 12 of ultra-high molecular weight polyethylene to a set of calender rolls 1. This preformed sheet 2 and a substrate 13 are then introduced in superposed layers into the space between an endless steel belt 3b and a feed roll 4a. With the preformed sheet 2 interposed between the endless belt 3b and the substrate 13, they are passed along the heating rolls 6a, 6b (and 6c) to come into surface-to-surface contact with the heating rolls and are pressed together to form a product sheet 8, which sheet is then wound up on a wind-up roll 10 by way of the cooling rolls 7a and 7b.

FIG. 2 is a schematic perspective view of the apparatus in another embodiment which is provided with five heating rolls. A preformed sheet 2, supplied from a sheet roll 11, and a substrate 13 are introduced into the space between a pair of endless steel belts 3a and 3b which pass around feed rolls 4a and 4b, respectively. In the like manner as the apparatus shown in FIG. 1, the endless steel belts 3a and 3b are stretched in opposite directions by guide rolls 5a and 5b and tension rolls 9a and 9b. Thus tension is applied to the endless steel belts 3a and 3b.

The endless steel belts 3a and 3b are travelling in surface-to-surface contact with a group of heating rolls 6a, 6b, 6c, 6d and 6e and cooling rolls 7a and 7b, during which the product sheet 8 is formed and wound up on a wind-up roll 10.

In the above forming process, when a thermoplastic resin having a melting point lower than that of the ultra-high molecular weight polyethylene is used as the substrate, it is desirable that the temperatures of the heating rolls 6b and 6d are set lower and the temperatures of the heating rolls 6a, 6c and 6e on the side of ultra-high molecular weight polyethylene are set higher, as described above. (The above description is of the case in which a substrate 13b in FIG. 2 is absent.)

When a laminated sheet of multi-layer structure is produced, it is possible to laminate a preformed sheet 2 and substrates 13a and 13b together, by providing the apparatus with delivery rolls 14a and 14b for the substrates. The substrates 13a and 13b can be either of the same material or different materials. Furthermore, the laminated sheet may also have a structure in which a substrate is interposed between two ultra-high molecular weight polyethylene layers.

Still further, the substrate and/or ultra-high molecular weight polyethylene may be subjected to surface treatment with corona discharge treatment devices 15a, 15b and 15c or the like.

The apparatus shown in FIG. 3 is provided with four heating rolls and a substrate 13 is fed to the point at which a powder 12 of ultra-high molecular weight polyethylene is formed into a sheet, thereby producing a laminated sheet.

In this apparatus, feed rolls 4a and 4b are arranged in parallel on a horizontal plane. The powder 12 of ultra-high molecular weight polyethylene and the substrate 13 are introduced into the space between a pair of tensioned endless steel belts 3a and 3b on the circumferential surfaces of feed rolls 4a and 4b. The endless steel belts 3a and 3b, which compress the powder 12 and the substrate 13 together, are moved at a predetermined speed along heating rolls 6a, 6b, 6c and 6d in a zigzag way, having surface contact with them. Thus the upper and lower surfaces of the pair of steel belts 3a and 3b are heated one after the other, and the steel belts 3a and 3b are then cooled by being passed round cooling rolls 7a and 7b. The laminated sheet 8 thus formed is then wound up on a wind-up roll 10 as a product. The thickness of the above laminated sheet 8 can be regulated properly by adjusting the gap between the feed rolls 4a and 4b.

It is only necessary that at least one layer of ultra-high molecular weight polyethylene is contained in the layered structure of the above laminated sheet. And the layered structure may be determined in accordance with the purposes and uses of the laminated sheets.

For example, UHMWPE laminated with at least one resin of low density polyethylene, linear low density polyethylene, ethylene-vinyl acetate copolymer, ethylene-ethyl acrylate copolymer, and modified polyolefin resin can be easily used by making it adhesive upon fusion.

When UHMWPE is laminated with other materials using adhesives at room temperature, the laminated sheets may take such layered structures as UHMWPE/adhesive/resin, UHMWPE/adhesive/metal foil, UHMWPE/adhesive/rubber, and UHMWPE/adhesive/paper, so that they may further be conveniently united with other materials like metal, rubber, plastics, wood and paper. Accordingly, the laminated sheets can be easily applied to specific portions, especially to sliding portions. For example, they can be used as lining materials for the inside walls of hoppers and buckets, for the surfaces of bulldozer shovels and skis, and for the sliding portions of conveyor guide plates.

If improved shock absorbing, shock resistant, or vibration resistant property is desired, the laminated sheets can be formed in the layer structures of UHMWPE/adhesive/rubber and UHMWPE/adhesive/foamed sheet. Furthermore, when reduced elongation and tensile creep are required for uses like belt conveyors, the properties can be improved by providing double or multiple layer structures of UHMWPE/wire net, UHMWPE/wire net/UHMWPE, UHMWPE/cloth and so forth. Still further, the shock resistance can be largely improved by the multiple layer structures such as synthetic resin/UHMWPE/synthetic resin and rubber/UHMWPE/rubber.

The method of the present invention will further be described in the following with reference to examples.

EXAMPLE 1

In the apparatus shown in FIG. 2, the surface temperature of heating rolls 6a to 6e was set to 170° C. and that of cooling rolls 7a and 7b and tension roll 9a was set to 10° C. A 0.3 mm thick porous sheet was preformed on calender rolls from an ultra-high molecular weight polyethylene (trademark: Hizex Million 240M, made by Mitsui Petrochemical Industries, Ltd.) A composite film consisting of an acid-modified polyethylene layer (30μ thick) and a Nylon layer (30μ thick) was superposed on the above porous sheet with the modified polyethylene layer in contact with the porous sheet. They were then fed between endless steel belts 3a and 3b (tension: 12 kg/cm) at feed rolls 4a and 4b. The endless steel belts 3a and 3b were moved at a speed of 30 cm/min along a series of heating rolls 6a to 6e and cooling rolls 7a and 7b. Thus, a 0.35 mm thick sheet of the ultra-high molecular weight polyethylene and the Nylon with an acid-modified polyethylene adhesive layer was obtained from the space between tension rolls 9a and 9b. This sheet was considerably transparent and had no occluded air bubbles.

The 180° peeling strength between the ultra-high molecular weight polyethylene layer and the Nylon layer of this sheet was 4 kg/cm.

EXAMPLE 20

The method of the invention was carried out as in Example 1 except that kraft paper laminated with low density polyethylene was used in place of the composite film of Nylon and acid-modified polyethylene. Thus a laminated sheet of paper and ultra-high molecular weight polyethylene with a low density polyethylene adhesive layer was obtained.

The 180° peeling strength between the ultra-high molecular weight polyethylene layer and the paper of this sheet was 5 kg/cm.

EXAMPLE 3

The method of the invention was carried out as in Example 1 except that zinc-plated steel wire net to which an adhesive layer of Surlyn (trademark, E.I. du Pont) was applied by melt coating, was used in place of the composite film of Nylon and acid-modified polyethylene. Thus a laminated sheet of ultra-high molecular weight polyethylene and wire net was obtained.

The 180° peeling strength between the ultra-high molecular weight polyethylene layer and the wire net of this sheet was 2 kg/cm.

EXAMPLE 4

The method of the invention was carried out as in Example 1 except that an aluminum foil that was coated with an adhesive layer of acid-modified polyethylene was used in place of the composite film of Nylon and acid-modified polyethylene. The lamination was carried out by bringing them together, with the acid-modified polyethylene layer being in contact with the ultra-high molecular weight polyethylene sheet, and a laminated sheet of the aluminum foil and the ultra-high molecular weight polyethylene was obtained.

The 180° peeling strength between the ultra-high molecular weight polyethylene layer and the aluminum foil of this sheet was 4 kg/cm.

Versiloke 506 (trademark of an adhesive, Huson Chemical) was applied to the aluminum foil side of the above laminated sheet and it was stuck to the surface of a clean steel sheet. Thus the ultra-high molecular weight polyethylene sheet was firmly joined to the steel sheet.

EXAMPLE 5

An apparatus like that shown in FIG. 2 was employed. Cotton cloth (0.5 mm thick) coated with Takelack (trademark of an adhesive, Takeda Chemical Industries, Ltd.) was interposed between two preformed corona discharge-treated sheets of ultra-high molecular weight polyethylene and these sheets were fed into the space between endless steel belts 3a and 3b (tension: 17 kg/cm) and the belts were passed along a series of heating rolls 6a to 6e kept at 170° C. in surface temperature. Thus a firmly united triple layer sheet of 0.7 mm in thickness with the layered structure of UHMWPE/cotton/UHMWPE was wound on the wind-up roll 10. The boundary surfaces of the layers in this sheet were firmly united, and it was not possible to peel the layers off.

The tensile elastic modulus of this laminated sheet was 230 kg/mm$^2$.

EXAMPLE 6

In the apparatus shown in FIG. 2, the surface temperature of heating rolls 6a, 6c and 6e was set to 175° C. and that of heating rolls 6b and 6d, to 190° C. A 5 mm thick vulcanized natural rubber sheet 13 that was coated with an adhesive of Saivinol SR-681 (trademark, Saiden Chemical Industry Co., Ltd.) and a 0.3 mm thick preformed, corona discharge-treated sheet of ultra-high molecular weight polyethylene 2 were superposed together and they were fed into the space between endless steel belts 3a and 3b (tension: 17 kg/cm), thereby obtaining a laminated sheet in which the natural rubber and the ultra-high molecular weight polyethylene were firmly joined.

The tensile elastic modulus of this laminated sheet was 20 kg/mm$^2$.

EXAMPLE 7

In the procedure of Example 6, 0.5 mm thick cotton cloth that was impregnated with Saivinol SR-681 was interposed between a natural rubber sheet and a preformed sheet of ultra-high molecular weight polyethylene and the lamination was carried out as in Example 6. A firmly joined triple layer sheet of natural rubber/cotton cloth/UHMWPE of 6 mm in thickness was obtained.

The tensile elastic modulus of this laminated sheet was 60 kg/mm$^2$.

EXAMPLE 8

In the procedure of Example 5, 1 mm thick glass roving mat that was treated with titanate treatment was used in place of the cotton cloth and the lamination was carried out as in Example 5. A 0.8 mm thick laminated sheet of the ultra-high molecular weight polyethylene and the glass mat was obtained.

The tensile elastic modulus of this laminated sheet wash 360 kg/mm$^2$.

EXAMPLE 9

In the apparatus in FIG. 2, the surface temperature of heating rolls 6a, 6c and 6e was set to 176° C. and that of heating rolls 6b and 6d, to 160° C. A preformed sheet 2 of ultra-high molecular weight polyethylene was superposed on a laminate 13 of a saponification product of ethylene-vinyl acetate copolymer (trademark: Eval, Kuraray Co., Ltd., 100μ thick) and acid-modified polyethylene (100μ thick), in which the ultra-high molecular weight polyethylene sheet was brought into contact with the acid-modified polyethylene layer. This was fed into the space between endless steel belts 3a and 3b (tension: 27 kg/cm, only the belt 3a was coated with polytetrafluoroethylene). By the above procedure, a 0.4 mm thick laminated sheet of the Eval and the ultra-high molecular weight polyethylene was obtained. The oxygen permeability of this laminated sheet was 0.2 ml/m$^2$·24hr·atm.

What is claimed is:

1. In a method for producing laminated sheets or films comprising at least one substrate layer and at least one layer of ultra-high molecular weight polyethylene, the improvement which comprises the steps of:

superposing at least one layer of ultra-high molecular weight polyethylene, said polyethylene characterized by an intrinsic viscosity of at least 8, as measured in a decalin solution at 135° C., in powder or preformed sheet form and at least one layer of a substrate of another material upon one face of a tensioned endless belt traveling around a set of rolls;

pressing said ultra-high molecular weight polyethylene layer between said substrate layer and said endless belt, or between said substrate layers, against at least one heating roll under the tension of said endless belt;

heating at least said ultra-high molecular weight polyethylene layer to a temperature above its melting point; and thereby uniting said superposed ultra-high molecular weight polyethylene and at least one substrate layer into a laminating sheet or film.

2. The method for producing laminated sheets or films in claim 1, wherein said substrate layer is a material selected from the group consisting of synthetic resins, rubbers, metal foils, metal sheets, wire nets, cloths, and papers.

3. The method for producing laminated sheets or films in claim 1 or 2, wherein the temperature of the heating rolls on the side of said substrate layer and the temperature of the heating rolls on the side of said ultra-high molecular weight polyethylene layer are different.

4. The method for producing laminated sheets or films of claims 1 or 2, wherein either or both of said substrate and ultra-high molecular weight polyethylene layers are subjected to surface treatment before they are superposed upon said endless belt.

5. The method for producing laminated sheets or films of claims 1 or 2, wherein a pair of endless belts are used.

6. The method for producing laminated sheets or films of claims 1 or 2 wherein an adhesive is interposed between said layer of ultra-high molecular weight polyethylene and said substrate layer.

* * * * *